July 29, 1930. T. DE W. HUBBELL Re. 17,759

CHECKING MECHANISM

Original Filed Oct. 8, 1923

INVENTOR
Theodore D. Hubbell.
Munn & Co.
ATTORNEY

Reissued July 29, 1930 Re. 17,759

UNITED STATES PATENT OFFICE

THEODORE DE WITT HUBBELL, OF LOS ANGELES, CALIFORNIA

CHECKING MECHANISM

Original No. 1,586,901, dated June 1, 1926, Serial No. 667,400, filed October 8, 1923. Application for reissue filed May 28, 1928. Serial No. 281,297.

My invention relates generally to checking mechanisms adapted for association with an element which is forcibly moved in one direction from a position to which it is normally urged, to retard or check the movement of the element to its urged position.

Specifically, my invention relates to a checking mechanism which is particularly adapted, although not necessarily, for checking the movement of a door to closed position in order to prevent slamming of the door.

It is a purpose of my invention to provide a door checking mechanism which operates to check or retard the closing movement of a door, not gradually as in similar mechanism heretofore proposed, but only when the door reaches a position adjacent its closed position, so that the period which the door remains in open position is greatly reduced.

It is also a purpose of my invention to provide a checking mechanism of extremely simple, inexpensive and durable construction and one which includes a piston and cylinder, the latter containing a checking fluid and positioned vertically to eliminate the necessity of providing a stuffing box around the piston rod as is necessary in other checking mechanisms to prevent the escape of the checking fluid.

A further purpose of my invention is provision of a checking mechanism including valve controlled ports in the piston with one of the valves adjustable to vary the checking action of the mechanism as desired.

I will describe only one form of checking mechanism embodying my invention, and will then point out the novel features thereof in claims.

Figure 3:
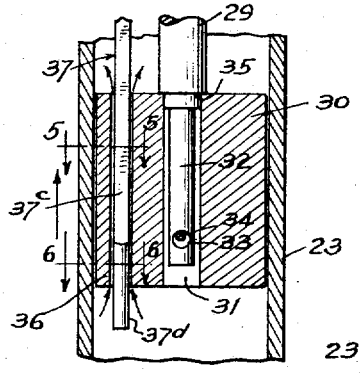
Figure 3 is a fragmentary sectional view of the device shown in Figure 2, but in another position.
Figure 5:
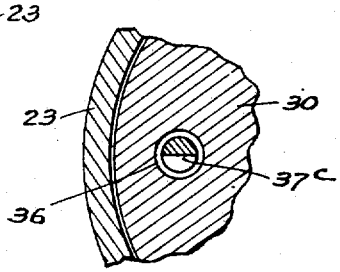
Figure 6:
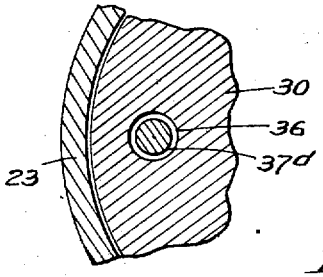

Figures 5 and 6 are sectional views taken on the lines 5—5 and 6—6, respectively, of Figure 3.

Similar reference characters refer to similar parts in each of the several views.

Figure 1:
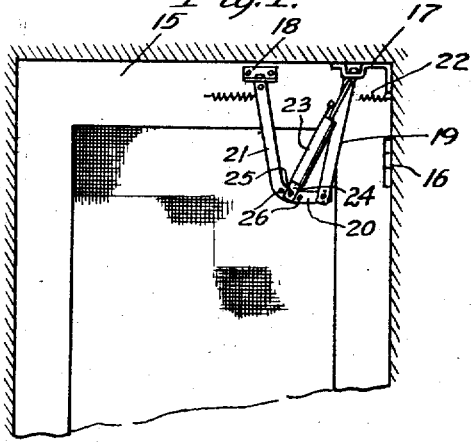
Figure 1 is a view showing a screen door having applied thereto one form of checking mechanism embodying my invention.

Referring specifically to the drawings and particularly to Figure 1, my invention in its present embodiment is shown as applied to a screen door 15, which is hinged as indicated at 16 to swing to open or closed position in the usual manner. The checking mechanism includes a bracket 17 secured to the wall of the opening which the door controls, and another bracket 18 secured to the frame of the door 15. A link 19 is pivoted at its upper end to the bracket 17 and at its lower end to the horizontal portion 20 of an L-shaped lever 21, the latter in turn being pivoted at its upper end to the bracket 18.

Figure 2:
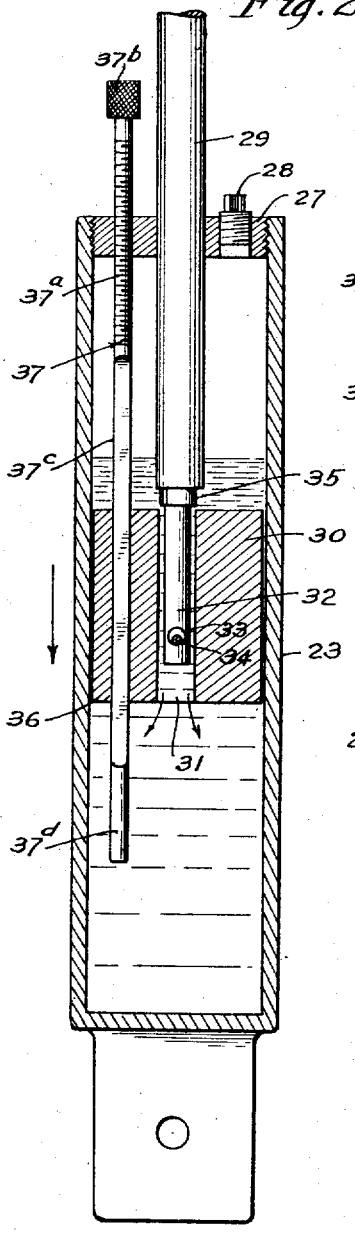
Figure 2 is an enlarged vertical sectional view of the checking device comprised in the mechanism shown in Figure 1.

A coil spring 22 is associated with the door 15, so as to normally urge the door to closed position, and a checking device is associated with the link 19 and the lever 21 to retard the movement of the door to closed position under the action of the spring 22. This checking device is shown in Figures 2 and 3, as comprising a cylinder 23 closed at its lower end and provided with an extension 24 through which a pin 25 (Figure 1) extends for the purpose of pivotally connecting the lower end of the cylinder to the horizontal portion 20 of the lever 21. In order that this connection may be rendered adjustable for a purpose which will be hereinafter described, the horizontal portion 20 is formed with a series of openings 26 through any one of which the pin 25 may extend for pivotally connecting the lever and cylinder.

Figure 4:
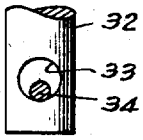
Figure 4 is a fragmentary detail view of the connection between the piston and piston rod of the device shown in Figure 2.

The upper end of the cylinder is normally open but is adapted to be closed by a screw disc 27, and the latter is formed with an opening closed by plug 28 and through which a checking fluid such as oil or the like may be introduced into the cylinder. The disc 27 is also formed with an axial opening through which a piston rod 29 slides, the lower end of the piston being operatively connected to a piston 30, which is slidably fitted within the cylinder 23. The piston 30 is provided with an axially disposed duct 31, and extending into this duct is a reduced extension 32 of the lower end of the rod 29. The extension 32 is provided with an opening 33, (Figure 4) through which extends a connecting pin 34, the latter also extending through a suitable transverse opening in the piston 30 whereby the rod is operatively connected to the piston. It will be noted that the opening 33 is considerably larger than the diameter of the pin 34, so that a limited vertical movement of the rod 29 is permitted independently of the piston 30.

At the junction of the extension 32 and the rod 29, a valve 35 is formed which in the lowermost position of the rod 29, with respect to the piston 30, snugly fits within the upper end of the duct 31, so as to close the duct and prevent circulation of the checking fluid therethrough.

The piston 30 is also formed with a second duct 36, through which the checking fluid is adapted to circulate in controlling relative movement of the piston and cylinder. A valve designated generally at 37, is adapted to control the passage of the checking fluid through the duct 36. This valve, in the present instance, comprises an elongated body or shank having a threaded portion $37^a$ extending through the disc 27 and formed at its upper end with a knurled head $37^b$. Below the threaded portion $37^a$ the body is formed with a flat face $37^c$, and at the lower end of this flattened portion the body is provided with a valve head $37^d$, which as clearly shown in Figure 6, is of circular form in contradistinction to the flat portion $37^c$ which as shown in Figure 5 is of semi-circular form in cross section. By virtue of the threaded connection between the disc 27 and the valve 37, the latter is capable of vertical adjustment within a cylinder 23, to vary the normal position of the head $37^d$ with respect to the piston 30.

As shown in Figure 1, the upper end of the piston rod 29, is pivotally connected to the link 19, but by reason of the mounting of the cylinder 23, and the movement of the link 19, and lever 21, during movement of the door, the rod is secured against longitudinal movement while the cylinder 23 moves longitudinally with respect to the rod.

In operation, the door 15 when moved to open position against the action of the spring 22 causes the lever 21 to swing in a direction away from the link 19, thereby drawing the cylinder 23 downwardly while the piston remains stationary. Initial downward movement of the cylinder 23 effects a slight downward movement of the piston 30, so that the latter moves from the position shown in Figure 3, to that shown in Figure 2. In this position of the piston which is defined by the connecting pin 34, the valve 35 is unseated with respect to the upper end of the duct 31, so that the checking fluid above the piston is free to pass to a point below the piston during the downward movement of the cylinder. It will thus be seen that as the downward movement of the cylinder is unrestricted the opening movement of the door is likewise unrestricted.

When the door is released, the spring 22 operates to move the door to closed position. However, the door is restricted during a major portion of this movement because of the flattened portion $37^c$ of the valve 37. It will be understood that during the closing movement of the door, the cylinder 23 is moved upwardly, thereby causing the valve 35 to seat and close the upper end of duct 31, to prevent upward passage of the fluid through the duct. However, the fluid is free to pass through the duct 36, because of the flattened portion $37^c$, and until the cylinder occupies such a position that the head $37^d$ is disposed within the duct 36, as shown in Figure 3. In this position of the head $37^d$, the duct 36 is substantially closed thus restricting the upward passage of the fluid through the duct and thereby perceptibly checking or retarding the movement of the cylinder and with it the closing movement of the door. From this operation it will be manifest that the door in its closing movement is unchecked until the door is adjacent closed position thereby reducing the time that the door actually occupies open position. This is of great advantage in screen doors as will be obvious. It is important to note that the piston and cylinder are supported wholly by the lever and link, and that opening or closing movement of the door is ineffective to appreciably disturb the substantially vertical position of the cylinder so that the possibility of the checking fluid escaping from the cylinder is prevented without the necessity of employing a stuffing box for the piston.

By reason of the adjustability of the valve 37, the instant at which the checking mechanism functions to actually check the closing movement of the door can be varied as desired, because by vertically adjusting the valve the position of the head $37^d$ with respect to the piston 30, is likewise varied. The adjustable connection between the cylinder 23 and the lever 21 provides further means for adjusting the checking action of the mechanism.

Although I have herein shown and described only one form of checking mechanism embodying my invention, it is to be understood that various changes and modifications may be made herein without departing from the spirit of the invention and the spirit and scope of the appended claims.

What I claim is:

1. A checking mechanism comprising a cylinder adapted to be pivotally arranged on a swinging support, a piston rod extending into the cylinder adapted to be connected to another swinging support, a piston operating in the cylinder to function against a body of liquid contained therein and provided with an axially disposed duct, means to permit slight relative movements of the rod and the piston and for mounting the latter to the former, a valve portion formed on the rod beyond one face of the piston and adapted to respectively seat against and unseat from said face of the piston on actuations of the cylinder and said rod, the piston having a second duct extending therethrough in parallelism with the first said duct, and an elongated body adjustable longitudinally of the cylinder from a point without same and through said second named duct and provided with portions respectively coacting with the walls of the said second named duct to control movements of fluid under relatively different conditions through said second duct in time with relative movements of the cylinder and said piston and in time with movements of the valve portion of the rod with respect to the said one face of the piston.

2. A door check embodying a fluid-containing cylinder, a piston movable in the cylinder and having a duct therein, a rod movable through one end of the cylinder and having a reduced portion loosely fitted in said duct, an operative connection between the reduced portion of the rod and the piston so as to allow limited relative movement of the rod and piston, said rod having a valve portion for closing and opening the duct upon relative movement of the rod and piston, said piston having a second duct therethrough, and an elongated body adjustable longitudinally of the cylinder and having a reduced portion coacting with said second duct for determining the passage of fluid therethrough from one side of the piston to the other side thereof in time with movements of the piston and said cylinder.

3. A door check as embodied in claim 2 wherein the operative connection between the piston and reduced rod portion comprises an opening in said reduced portion, and a pin loosely fitted in the opening and carried by the piston.

THEODORE DE WITT HUBBELL.